US011243896B2

(12) United States Patent
Sato (10) Patent No.: US 11,243,896 B2
(45) Date of Patent: Feb. 8, 2022

(54) MULTIPLE PIN CONFIGURATIONS OF MEMORY DEVICES

(71) Applicant: Micron Technology, Inc., Boise, ID (US)

(72) Inventor: Junichi Sato, Yokohama (JP)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 16/829,890

(22) Filed: Mar. 25, 2020

(65) Prior Publication Data
US 2021/0303483 A1 Sep. 30, 2021

(51) Int. Cl.
*G06F 13/38* (2006.01)
*G06F 13/16* (2006.01)

(52) U.S. Cl.
CPC .............. *G06F 13/1668* (2013.01)

(58) Field of Classification Search
CPC .................................................. G06F 13/1668
See application file for complete search history.

(56) References Cited

U.S. PATENT DOCUMENTS

| | | | |
|---|---|---|---|
| 8,386,694 B2 | 2/2013 | Sukegawa | |
| 8,631,191 B2 | 1/2014 | Hashimoto | |
| 9,448,742 B2 | 9/2016 | Cheng et al. | |
| 9,912,902 B2 | 3/2018 | Oien et al. | |
| 10,210,123 B2* | 2/2019 | Olarig | G06F 13/4282 |
| 10,394,731 B2 | 8/2019 | Davis et al. | |
| 2004/0177194 A1 | 9/2004 | Benson et al. | |
| 2005/0010712 A1 | 1/2005 | Kim et al. | |
| 2013/0212325 A1 | 8/2013 | Hashimoto | |
| 2015/0143017 A1 | 5/2015 | Brontvein et al. | |
| 2018/0357076 A1 | 12/2018 | Wietfeldt et al. | |
| 2019/0179569 A1 | 6/2019 | Yang | |
| 2019/0196924 A1 | 6/2019 | Gregg et al. | |
| 2019/0287583 A1 | 9/2019 | Hollis | |
| 2020/0026683 A1* | 1/2020 | Olarig | G06F 13/4022 |
| 2020/0301618 A1* | 9/2020 | Olarig | G06F 3/0607 |

OTHER PUBLICATIONS

SSD Form Factor Working Group, Enterprise SSD Form Factor, 2011, SSD Form Factor Group, pp. 1-56. (Year: 2011).*
International Search Report and Written Opinion, PCT/US2021/019241, dated Jun. 17, 2021.
International Search Report and Written Opinion, PCT/US2021/015512, dated May 13, 2021.

* cited by examiner

*Primary Examiner* — Cheng Yuan Tseng
(74) *Attorney, Agent, or Firm* — Greenberg Traurig (57) ABSTRACT

An apparatus configured to allow data values to be written into the plurality of memory cells of the memory device at a first speed upon connecting to a first host via a first configuration of the plurality of connectors; and allow data values to be written into the plurality of memory cells at a second speed faster than the first speed, upon connecting to a second host via a second configuration of the plurality of connectors.

19 Claims, 6 Drawing Sheets

MULTIPLE PIN CONFIGURATIONS OF MEMORY DEVICES

FIELD OF THE TECHNOLOGY

At least some embodiments disclosed herein relate to memory systems in general, and more particularly, but not limited to memory devices having multiple pin configurations.

BACKGROUND

A memory system can include one or more memory components that store data. The memory components can be, for example, non-volatile memory components and volatile memory components. In general, a host system can utilize a memory system to store data at the memory components and to retrieve data from the memory components.

BRIEF DESCRIPTION OF THE DRAWINGS

The embodiments are illustrated by way of example and not limitation in the figures of the accompanying drawings in which like references indicate similar elements.

DETAILED DESCRIPTION

At least some aspects of the present disclosure are directed to a memory system having multiple pin configurations. Different pin configurations allow the memory system to connect to different connection systems. For example, a non-standard pin configuration can be used to increase the communication bandwidth for loading content into the memory system and reduce the time for pre-installing content (e.g., data, instructions) into the memory system in a manufacturer facility; and a standard pin configuration can be used in a product system that uses the memory system and the content according to a standard protocol. In general, a memory system can be a storage device, a memory module, a memory device, or a hybrid of a storage device and memory module. Examples of memory devices, storage devices and/or memory modules are described below in conjunction with FIG. 1. In general, a host system can utilize a memory system that includes one or more memory components, such as memory devices that store data. The host system can provide data to be stored at the memory system and can request data to be retrieved from the memory system.

An integrated circuit memory device (e.g., a flash memory device, ROM device) can be programmed to store data received at a connector interface. Such connector interface has a plurality of connectors (e.g., pins), which are typically configured according to a standard pin configuration for interoperability. For example, according to a standard pin configuration, a pin has a predefined usage and designed to communicate signals of a predefined type according to a specific communication protocol. For example, a pin can be designated to communicate a predefined type of signals, such as a clock signal (CLK), a clock enable signal (CKE), a chip select signal, a row address strobe signal (RAS), a column address strobe signal (CAS), a write enable signal (WE), a reset signal (RESET), a data I/O signal, an output disable signal, an address signal, a bank address signal, etc.

Content can be loaded into a memory system during the manufacturing of a product system to pre-install data, instructions, applications, firmware, software, etc. However, a standard pin configuration may not be optimal for the operation of pre-installing the content at a manufacturing facility.

At least some aspects of the present disclosure address the above and other deficiencies by providing a memory system/device having a temporary pin configuration that can be used in a manufacturing facility for optimized usage in pre-installation of content, and a normal/standard pin configuration for being connected in a product system after leaving the manufacturing facility. For example, when the memory system/device is connected in the manufacturing facility, the temporary pin configuration allows data/instructions to be loaded into the memory device for pre-installation at a speed faster than using the standard pin configuration. As a result, the use of such a memory system/device can reduce the time for content pre-installation during manufacturing of products and improve the efficiency in production.

Figure 1:
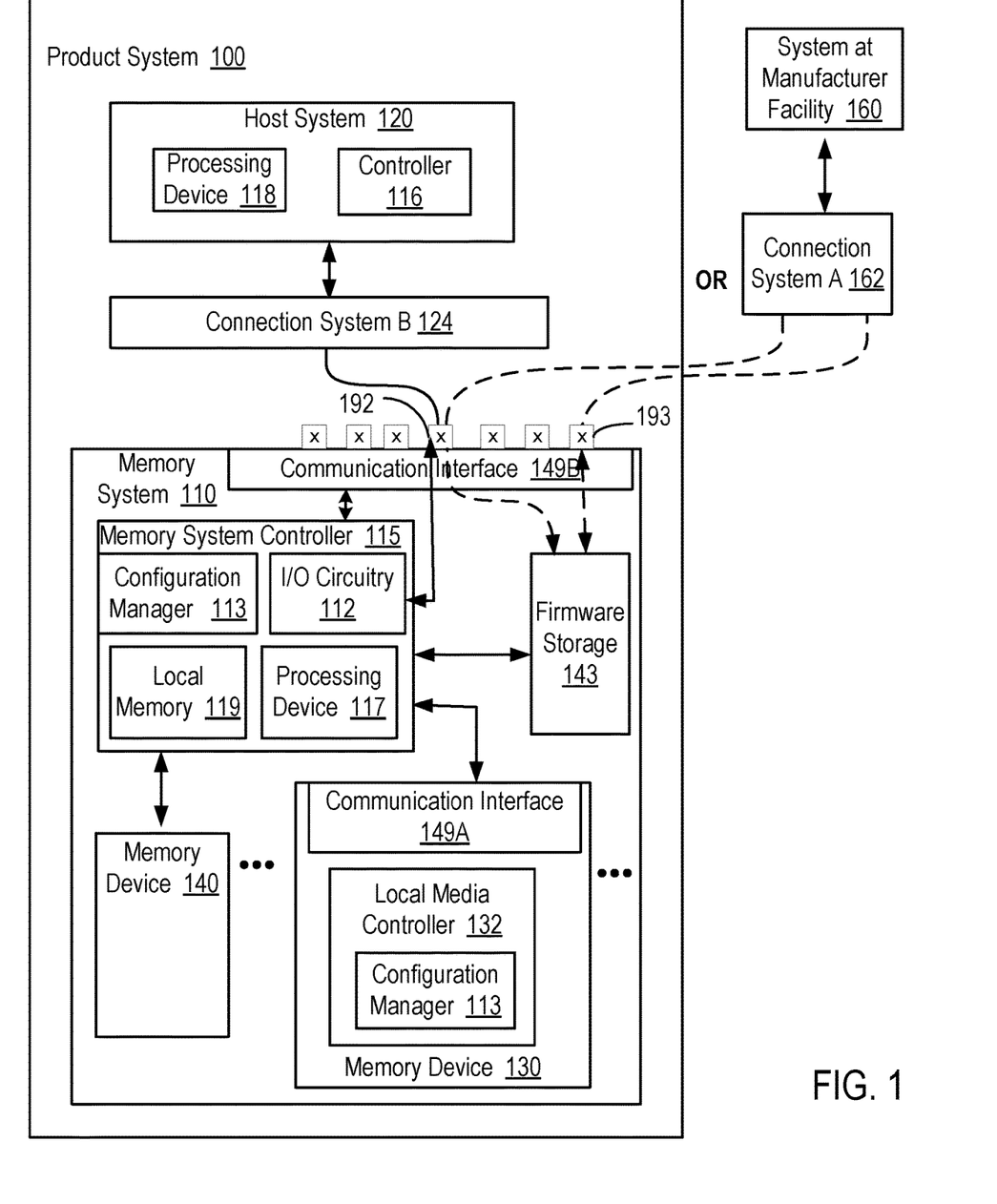
FIG. 1 illustrates a memory system that can be connected via one pin configuration when configured in a product system and via another pin configuration during manufacturing in accordance with some embodiments of the present disclosure.

FIG. 1 illustrates a memory system that can be connected via one pin configuration when configured in a product system and via another pin configuration during manufacturing in accordance with some embodiments of the present disclosure.

FIG. 1 illustrates an example product computing system 100 that includes a memory system 110 in accordance with some embodiments of the present disclosure. The memory system 110 can include media, such as one or more volatile memory devices (e.g., memory device 140), one or more non-volatile memory devices (e.g., memory device 130, firmware storage 143), or a combination of such.

A memory system 110 can include one or more storage devices, memory modules, or a hybrid of a storage devices and memory modules. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) card, and a hard disk drive (HDD). Examples of memory modules include a dual in-line memory module (DIMM), a small outline DIMM (SO-DIMM), and various types of non-volatile dual in-line memory module (NVDIMM).

The computing product system 100 (or computing system 100, product system 100, or product 100 for simplicity) can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to a memory system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset (e.g., processing device 118) and a software stack executed by the processor chipset. The processor chipset can include one or more cores, one or more caches, a memory controller (e.g., controller 116) (e.g., NVDIMM controller), and a storage protocol controller (e.g., PCIe controller, SATA controller). The host system 120 uses the memory system 110, for example, to write data to the memory system 110 and read data from the memory system 110. In some embodiment, the host system 120 also reads from the firmware storage 143 to execute various tasks of a booting process.

The host system 120 can be coupled to the memory system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory system 110. The host system 120 can further utilize an NVM Express (NVMe) interface to access components (e.g., memory devices 130) when the memory system 110 is coupled with the host system 120 by the PCIe interface. The physical host interface can provide a connector interface (e.g., communication interface 149B) for passing control, address, data, and other signals between the memory system 110 and the host system 120. As shown in FIG. 1, the host system 120 is coupled to the memory system 110 via a connection system 124 (e.g., a memory network bus enabled by the above-described physical interfaces, etc.). Further, FIG. 1 illustrates a memory system 110 as an example. In general, the host system 120 can access a memory system having multiple memory systems via a same communication connection, multiple separate communication connections, and/or a combination of communication connections.

The processing device 118 of the host system 120 can be, for example, a microprocessor, a central processing unit (CPU), a processing core of a processor, an execution unit, etc. In some instances, the controller 116 can be referred to as a memory controller, a memory management unit, and/or an initiator. In one example, the controller 116 controls the communications over a bus coupled between the host system 120 and the memory system 110. In general, the controller 116 can send commands or requests to the memory system 110 for desired access to memory devices 130,140, and firmware memory 143. The controller 116 can further include interface circuitry to communicate with the memory system 110. The interface circuitry can convert responses received from memory system 110 into information for the host system 120.

The controller 116 of the host system 120 can communicate with controller 115 of the memory system 110 to perform operations such as reading data, writing data, or erasing data at the memory devices 130,140, and other such operations. The controller 116 of the host system 120 can also communicate with controller 115 of the memory system 110 to perform operations for accessing firmware memory (e.g., firmware storage 143) during, for example, a booting process. In some instances, the controller 116 is integrated within the same package of the processing device 118. In other instances, the controller 116 is separate from the package of the processing device 118. The controller 116 and/or the processing device 118 can include hardware such as one or more integrated circuits (ICs) and/or discrete components, a buffer memory, a cache memory, or a combination thereof. The controller 116 and/or the processing device 118 can be a microcontroller, special purpose logic circuitry (e.g., a field programmable gate array (FPGA), an application specific integrated circuit (ASIC), etc.), or another suitable processor.

The memory devices 130, 140 can include any combination of the different types of non-volatile memory components and/or volatile memory components. The volatile memory devices (e.g., memory device 140) can be, but are not limited to, random access memory (RAM), such as dynamic random access memory (DRAM) and synchronous dynamic random access memory (SDRAM).

Some examples of non-volatile memory components include a negative-and (NAND) type flash memory and write-in-place memory, such as three-dimensional cross-point ("3D cross-point") memory. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 and/or firmware memory 143 can include one or more arrays of memory cells. One type of memory cell, for example, single level cells (SLC) can store one bit per cell. Other types of memory cells, such as multi-level cells (MLCs), triple level cells (TLCs), and quad-level cells (QLCs), can store multiple bits per cell. In some embodiments, each of the memory devices 130 can include one or more arrays of memory cells such as SLCs, MLCs, TLCs, QLCs, or any combination of such. In some embodiments, a particular memory device can include an SLC portion, and an MLC portion, a TLC portion, or a QLC portion of memory cells. The memory cells of the memory devices 130 and/or firmware memory 143 can be grouped as pages that can refer to a logical unit of the memory device used to store data. With some types of memory (e.g., NAND), pages can be grouped to form blocks.

Although non-volatile memory devices such as 3D cross-point type and NAND type memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory system controller 115 (or controller 115 for simplicity) can communicate with the memory devices 130, 140, to perform operations such as reading data, writing data, or erasing data at the memory devices 130 and other such operations (e.g., in response to commands scheduled on a command bus by controller 116). The controller 115 can also communicate with firmware storage 143 to perform operations such as reading data during non-booting processes, and writing data or erasing data during a booting process. The controller 115 can include hardware such as one or more integrated circuits (ICs) and/or discrete components, a buffer memory, or a combination thereof. The hardware can include digital circuitry with dedicated (i.e., hard-coded) logic to perform the operations described herein. The controller 115 can be a microcontroller, special purpose logic circuitry (e.g., a field programmable gate array (FPGA), an application specific integrated circuit (ASIC), etc.), or another suitable processor.

The controller 115 can include a processing device 117 (processor) configured to execute instructions stored in a local memory 119. In the illustrated example, the local memory 119 of the controller 115 includes an embedded memory configured to store instructions for performing various processes, operations, logic flows, and routines that control operation of the memory system 110, including handling communications between the memory system 110 and the host system 120.

In some embodiments, the local memory 119 can include memory registers storing memory pointers, fetched data, etc. The local memory 119 can also include read-only memory (ROM) for storing micro-code. While the example memory system 110 in FIG. 1 has been illustrated as including the controller 115, in another embodiment of the present disclosure, a memory system 110 does not include a controller 115, and can instead rely upon external control (e.g., provided by an external host, or by a processor or controller separate from the memory system).

In general, the controller 115 can receive commands or operations from the host system 120 and can convert the commands or operations into instructions or appropriate commands to achieve the desired access to the memory devices 130 and/or firmware memory 143. The controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130 and/or firmware memory 143. The controller 115 can further include host interface circuitry (e.g., via an I/O circuit 112) to communicate with the host system 120 via the physical host interface. The host interface circuitry can convert the commands received from the host system into command instructions to access the memory devices 130 and/or firmware memory 143 as well as convert responses associated with the memory devices 130 into information for the host system 120.

The memory system 110 can also include additional circuitry or components that are not illustrated. In some embodiments, the memory system 110 can include a cache or buffer (e.g., DRAM) and address circuitry (e.g., a row decoder and a column decoder) that can receive an address from the controller 115 and decode the address to access the memory devices 130, and firmware storage 143.

In some embodiments, the memory devices 130 include local media controllers 132 that operate in conjunction with memory system controller 115 to execute operations on one or more memory cells of the memory devices 130. An external controller (e.g., memory system controller 115) can externally manage the memory device 130 (e.g., perform media management operations on the memory device 130). In some embodiments, a memory device 130 is a managed memory device, which is a raw memory device combined with a local controller (e.g., local controller 132) for media management within the same memory device package. An example of a managed memory device is a managed NAND (MNAND) device.

The memory system 110 can include a memory device configured as a firmware storage 143 for storing instructions, such boot instructions, BIOS (basic input/output system) instructions, and/or an operating system for the memory system 110 and/or for the host system 120. The firmware storage 143 can be implemented in the memory device 130, or a memory device similar to the memory device 130. During a manufacturing process of the product system 100, the content of the firmware storage 143 can be pre-loaded using a non-standard pin/connector configuration to reduce the time of pre-installation.

For example, the memory system 110 of FIG. 1 can have multiple pin/connector configurations. The communication interface 149B of the memory system 110 is coupled with the connectors (e.g., 192 and 193). The communication interface 149B can connect the connectors differently to components inside the memory system 110 depending on whether the connectors (e.g., 192 and 193) are connected to the connection System B 124 in the product system 100 or to the connection system A 162 for a system at a manufacturer facility 160.

For example, when the memory system 110 is connected to the connection system B 124, the connector 192 is connected through the communication interface 149B to the memory system controller 115 (e.g., the I/O circuitry 112 of the memory controller 115). However, when the memory system 110 is connected to the connection system A 162, the connector 192 is connected through the communication interface 149B to the firmware storage 143.

For example, when the memory system 110 is connected to the connection system B 124, the connector 193 is not used. However, when the memory system 110 is connected to the connection system A 162, the connector 193 is connected through the communication interface 149B to the firmware storage 143.

The extra connections via the connectors 192 and/or 193 to the firmware storage 143 allow the system at the manufacturer facility 160 to load data via a non-standard connection system A into the firmware storage 143 at a speed faster than the host system 120 can through a standard connection system B.

Similarly, a memory device 130 can have multiple pin configurations to support normal usages in the product system 100, and non-standard, faster data loading in connection with the system at the manufacturer facility 160.

The controller 115 of the memory system 110 can include a configuration manager 113 configured to manage the communication interface 149A for connecting to different connection systems 124 and 162. Similarly, the controller 132 of the memory device 130 can include a configuration manager 113 configured to manage the communication interface 149B for connecting to different connection systems (e.g., to the controller 115 of the memory system 110 or to the system of the manufacturer facility 160).

When the memory system 110 (or the memory device 130) is connected to the system of the manufacturer facility 160, the system of the manufacturer facility 160 can load data, firmware and/or software into the memory system 110 (or the memory device 130) for pre-installation, diagnosis, or repair of data, firmware and software designed for the product 100.

Figure 2:
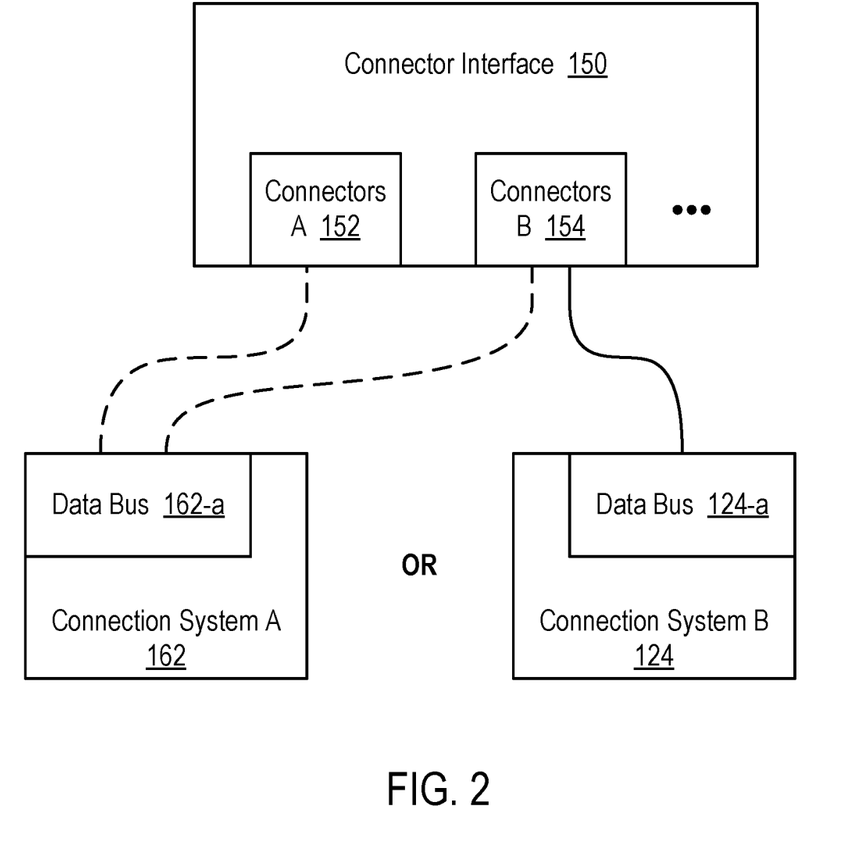
FIG. 2 illustrates an example of two connector configurations of a memory system or device according to one embodiment.

FIG. 2 illustrates an example of two connector configurations of a memory system or device according to one embodiment. For example, the communication interface 149A of the memory device 130 configured in the memory system 110 of FIG. 1, and/or the communication interface 149B of the memory system 110 of FIG. 1 can be implemented to use the connection configurations of the connector interface 150 of FIG. 2.

In FIG. 2, the connector interface 150 includes a connector set A 152 and a connector set B 154 and optionally, other connectors. In general, each of the connector sets 152 and 154 can be one or more pins or connectors. Thus, the technique illustrated in FIG. 2, can be used with any number of connectors in a connector set and with any number of connector set and is not limited to the example depicted in FIG. 2.

Figure 3:
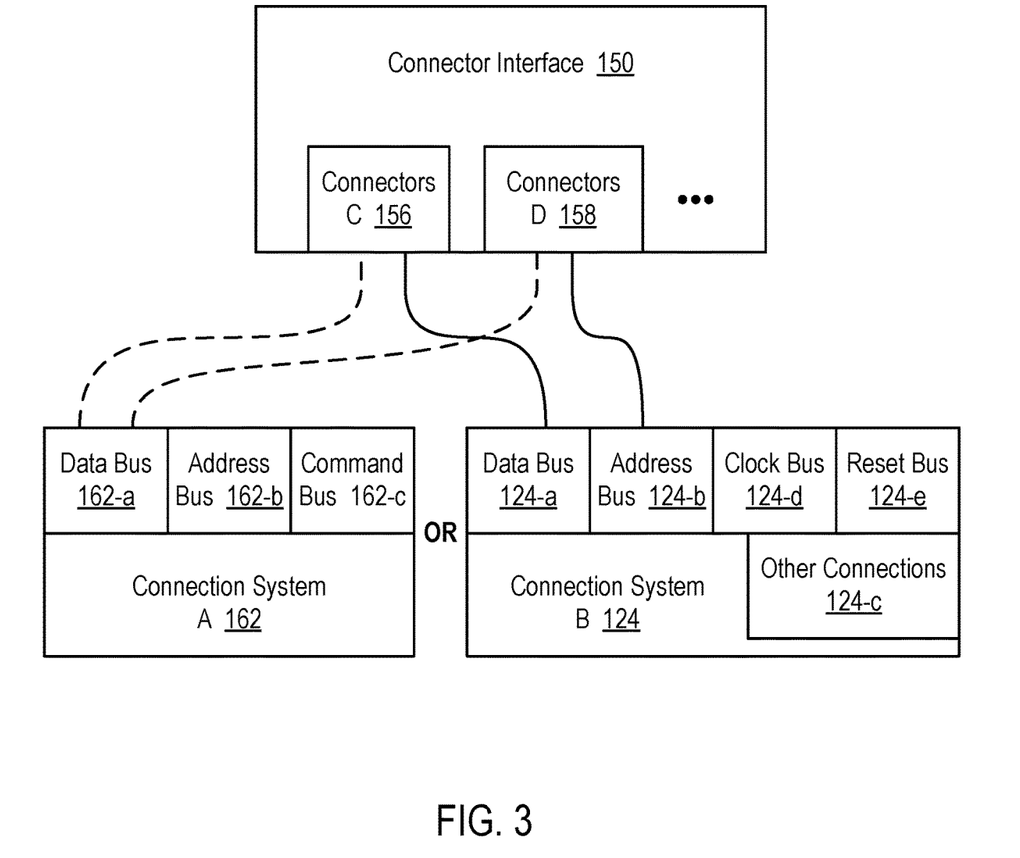
FIG. 3 illustrates another example of multiple connector configurations of a memory system or device according to one embodiment.

FIG. 2 illustrates two connector/pin configurations. In one configuration for connection to a connection system A 162 (e.g., to a system of a manufacturer facility 160 of FIG. 1), both the connector set A 152 and the connector set B 154 are used with a data bus 162-a. In another configuration for connection to a connection system B 124 (e.g., to a host system 120 of the product system 100 of FIG. 1, or a controller 115 of the memory system 110 of FIG. 1), the connector set B 154 is used with the data bus 124-a, but the connector set A 152 is not connected to the data bus 124-a. In some implementations, the connector set B 154 is an extra connector set that is used with the connection system A 152, but not used with the connection system B 124. In other implementations, when used with the connection system B 124, the connector set A 152 can be used for a different purposed (e.g., for connecting to an address bus, or for connecting to a command bus), as illustrated in FIG. 3.

For example, when being connected to the connection system A 162, the connector set A 152 is configured as an extra data pin(s) in a temporary pin configuration, which increases the data communication bandwidth through the connection interface 150. The connector set B 154 is configured as a data pin(s) in a normal pin configuration, and also used as a data pin(s) in the temporary pin configuration. When the connector interface 150 is connected to the connection system B 124, the connector set A 152 is not used or otherwise disenabled/de-activated/in-accessible. Unlike the connector set A 152, the connector set B 154 remains as a data pin in both configurations.

For example, the extra connector set A 152 is configured for connecting to the connection system A 162 in one pin configuration (e.g., for connection to the system of the manufacturer facility 160), but not available or used in another pin configuration (e.g., for connection to the connection system B 124 of a product system 100). In contrast, the connector set B 154 is configured for connecting to both the connection system A 162 in one pin configuration, and for connecting to the connection system B 124 in another pin configuration.

In some embodiments, the connector set A 152 is an extra pin set provided to increase the data bandwidth when writing data to a memory device 130, for example, when in a production/manufacturer facility. In other embodiments, the connector set A 152 includes an uncommitted or reserved general purpose pin (e.g., GPIO pin) in the pin configuration for connecting to the connection system B 124 of the product system 100. In some implementations, the connector set A 152 is rendered in-accessible, unusable, disabled or deactivated, physically and/or electrically, when the connector interface 150 is used with the connection system B 124.

A configuration manager 113 can configure a communication interface (e.g., 149A or 149B) coupled with the connector interface 150 to process the signals received in the connectors (e.g., 152 and 154) in accordance with the different pin/connector configurations expected by the connection systems 124 and 162.

The configuration manager 113 can be configured to identify the connection system (e.g., 124 or 162) to which the connector interface 150 is currently being connected by sensing the connection and/or signals to the extra pin set 152. For example, when the extra pin set 152 is deactivated by one or more of: mechanical de-attachment, access blockage, lack of electrical signals in a period of time, etc., the configuration manager 113 can be determine that the connector interface 150 is being connected to the standard connection system B 124. However, if the extra pin set 152 is found to be active, the configuration manager 113 can determine that the connector interface 150 is being connected to the non-standard connection system A 162.

In one implementation, a non-volatile register in the memory system/memory device stores an indication of whether to configure the communication interface (149A or 149B) for a temporary configuration that uses the extra pin set 152, or for a normal configuration that does not use the extra pin set 152. The indication can be updated to change the desirable pin configuration to be effectuated by the configuration manager 113.

FIG. 3 illustrates another example of multiple connector configurations of a memory system or device according to one embodiment. For example, the communication interface 149A of the memory device 130 configured in the memory system 110 of FIG. 1, and/or the communication interface 149B of the memory system 110 of FIG. 1 can be implemented to use the pin/connector configurations of connector interface 150 of FIG. 3.

In FIG. 3, the connector interface 150 includes a connector set C 156 and a connector set D 158 and optionally, other connectors. In general, each of the connector sets 156 and 158 can be one or more pins or connectors. Thus, the technique illustrated in FIG. 3, can be used with any number of connectors in a connector set and with any number of connector set and is not limited to the example depicted in FIG. 3. Further, the technique illustrated in FIG. 3 can be used in combination with the technique illustrated in FIG. 2.

In FIG. 3, when the connector interface 150 is used with the connection system A 162 (e.g., of a system of a manufacturer facility), both the connector set C 156 and the connector set D 158 are configured as part of a data pin set in one pin configuration. On the other hand, when the connector interface 150 is used with the connection system B 124, the connector set C 156 remains as part of a data pin set in another configuration, but the connector set D 158 is used as part of an address pin set in the configuration. As such, the connector set C 156 is used as a data pin(s) in one configuration and as an address pin(s) in another configuration.

For example, when a memory device 130 (or a memory system 110) having the connection interface 150 is configured in the product system 100, the connector set D 158 is used to communicate address signals over an address bus 124-b. The connector set D 158 can be a subset of the address pins connected to the address bus 124-b, or the entire set of the address pins connected to the address bus 124-b in the normal pin configuration in the product system 100.

However, when the connection interface 150 is temporarily connected to the system of the manufacturer facility 160 (e.g., in the process of pre-installation data, application, software, firmware), the connector set D 158 is temporarily re-purposed as data pins to increase the data communication bandwidth to the memory device 130 (or a memory system 110).

For example, during the pre-installation process, the data can be stored into a predefined location; and thus, it is not necessary to transmit the address signals. Therefore, the address pins can be temporarily re-connected to receive data to be stored into the memory device 130 (or a memory system 110).

Alternatively, the communication protocol used with the connection system A 162 can be adjusted for the pre-installation process to use the initially transmitted data as an initial address; and subsequent address can be calculated automatically according to a predefined function to avoid the need to transmit further addresses.

In some implementations, a portion of the address pins (e.g., 158) connected to the address bus 124-b in the normal pin configuration is used as additional data pins connected to the data bus 162-a in the temporary configuration during pre-installation; and the remaining portion of the address pins connected to the address bus 124-b in the normal pin configuration can be used as address pins connected to the address bus 162-b in the temporary pin configuration to transmit addresses. The addresses received in the address bus 162-b with a reduced pin count can be translated to a subset of the regular addresses in the memory system/device for pre-installation.

FIG. 3 illustrates an example of re-purposing one or more address pins as data pins in a temporary pin configuration. Alternatively, or in combination, other types of pins in the normal pin configuration in the product system 100 can also be re-purposed as data pins in the temporary pin configuration. For example, some of the pins connected to the clock bus 124-d, reset bus 124-e, or other connections 124-c in the normal pin configuration of the connection system B 124 can be re-configured as extra data pins in the temporary pin configuration of the connection system A 162. Optionally, some of the pins connected to the clock bus 124-d, reset bus 124-e, or other connections 124-c in the normal pin configuration can be used with corresponding types of buses (e.g., 162-c) in the temporary configuration.

Figure 4:
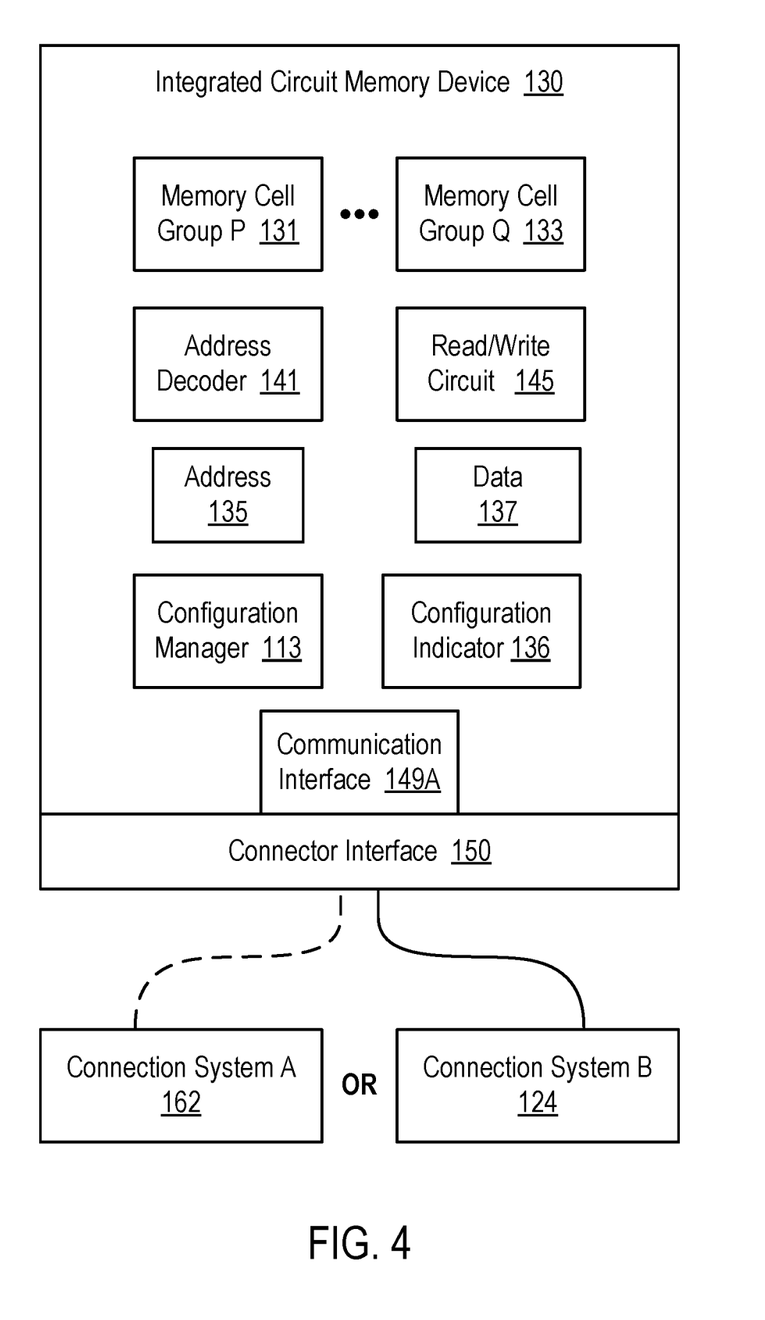
FIG. 4 illustrates a memory device having a pin configuration manager according to one embodiment.

FIG. 4 illustrates a memory device 130 having a pin configuration manager 113 according to one embodiment. For example, the memory device 130 in the memory system 110 of FIG. 1 can be implemented using the integrated circuit memory device 130 of FIG. 4. For example, the configuration manager 113 can configure the communication interface 149A of the memory device 130 to effectuate the configurations illustrated in FIG. 2 and/or FIG. 3.

The integrated circuit memory device 130 can be enclosed in a single integrated circuit package. The integrated circuit memory device 130 includes multiple groups 131, . . . , 133 of memory cells that can be formed in one or more integrated circuit dies. A typical memory cell in a group 131, . . . , 133 can be programmed to store one or more bits of data.

Some of the memory cells in the integrated circuit memory device 130 can be configured to be operated together for a particular type of operations. For example, memory cells on an integrated circuit die can be organized in planes, blocks, and pages. A plane contains multiple blocks; a block contains multiple pages; and a page can have multiple strings of memory cells. For example, an integrated circuit die can be the smallest unit that can independently execute commands or report status; identical, concurrent operations can be executed in parallel on multiple planes in an integrated circuit die; a block can be the smallest unit to perform an erase operation; and a page can be the smallest unit to perform a data program operation (to write data into memory cells). Each string has its memory cells connected to a common bitline; and the control gates of the memory cells at the same positions in the strings in a block or page are connected to a common wordline. Control signals can be applied to wordlines and bitlines to address the individual memory cells.

The integrated circuit memory device 130 has a connector interface 150 that can be connected to a connection system A 162 or a connection system B 124, which have different pin/connector configurations. From the signals received in the connector interface 150, the communication interface 149 can provide an address 135 and data 137 and cause the read/write circuit 145 to use the address decoder 141 to generate signals for addressing the memory cells (e.g., 131 and 133) according to the address 135 and to store the data 137 into the addressed memory cells (e.g., 131 and 133).

An address decoder 141 of the integrated circuit memory device 130 converts the address 135 into control signals to select the memory cells in the integrated circuit memory device 130; and a read/write circuit 145 of the integrated circuit memory device 130 performs operations to determine data stored in the addressed memory cells or to program the memory cells to have states corresponding to storing the data 137. The integrated circuit memory device 130 also receives other signals at the connector interface 150 from the controller 115 of a memory system 110, including reset signals, clock signals, and the like.

The memory device 130 can include a configuration indicator 136. In some implementations, the configuration manager 113 can determine whether the connector interface is connected to the connection system A 162 or to a connection system B 124.

For example, when the connector interface 150 has one or more extra pins (e.g., 152) for the connection system A 162, the configuration manager 113 can determine whether or not the connector interface 150 is connected to the connection system A 162 by testing or checking the connection status of the extra pin(s).

For example, when the connector interface 150 has one or more pins that are used for the data bus 162-a for the connection system A 162 and for a non-data bus or connection for the connection system B 124, the configuration manager 113 can determine whether or not the connector interface 150 is connected to the connection system A 162 by testing or checking whether signal characteristics in such pin(s) are consistent with being connected to a data bus 162-a.

In some implementations, the configuration indicator 136 is stored in a non-volatile memory cell. The non-volatile memory cell initially stores a value identifying a pin configuration for the connection system A 162. After the memory device 130 is connected to the system of the manufacturer facility 160 and after the pre-installation of content in the memory device 130, the non-volatile memory cell can be updated to store a different value identifying a pin configuration for the connection system B 124.

The configuration manager 113 can be implemented at least in part using a logic circuit coupled to the communication interface 149A. In some implementations, the configuration manager 113 can also be implemented using instructions executed by one or more processing devices (e.g., 117 or 132).

When the connection interface 150 is connected to the communication system A 162, and/or when the configuration indicator 136 requests for a pin configuration for the communication system A 162, the configuration manager 113 causes the communication interface 149A to use signals received at the extra connector set A 152 in recovering the data 137 to be written into the memory cells of the memory device 130.

However, when the connection interface 150 is connected to the communication system B 124, and/or when the configuration indicator 136 requests for a pin configuration for the communication system B 124, the configuration manager 113 causes the communication interface 149A to ignore signals received at the extra connector set A 152.

Similarly, when the connection interface 150 is connected to the communication system A 162, and/or when the configuration indicator 136 requests for a pin configuration for the communication system A 162, the configuration manager 113 causes the communication interface 149A to use signals received at the connector set D 158 in recovering the data 137 to be written into the memory cells of the memory device 130. Further, the configuration manager 113 causes the communication interface 149A to generate the address 135 without using the signals received at the connector set D 158. For example, the address 135 can be generated, according to a predetermined mapping scheme, from signals of remaining address pins connected to the address bus 162-b of the communication system A 162. For example, the address 135 can be generated based on the sequence of data items received via the data bus 162-a of the communication system A 162.

However, when the connection interface 150 is connected to the communication system B 124, and/or when the configuration indicator 136 requests for a pin configuration for the communication system B 124, the configuration manager 113 causes the communication interface 149A to use signals received at the connector set D 158 in recovering the address 135 in the memory device 130.

Figure 5:
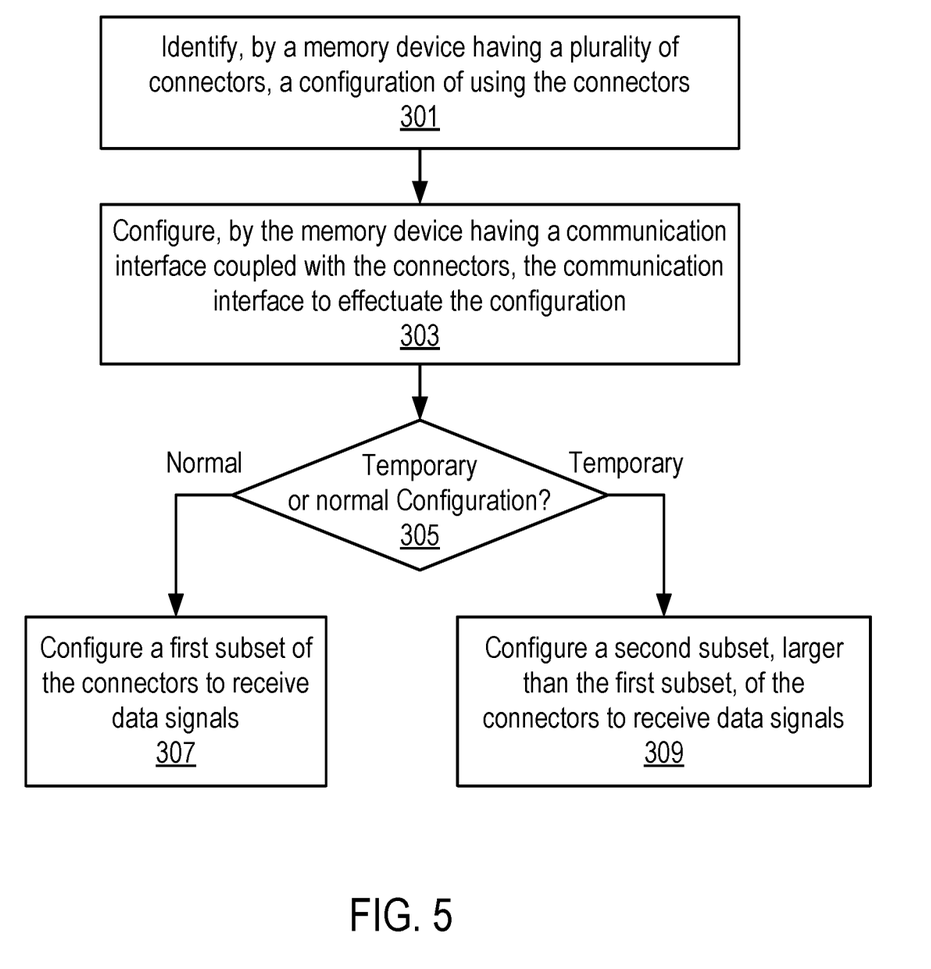
FIG. 5 illustrates an example method of managing pin configurations according to one embodiment.

FIG. 5 illustrates an example method of managing pin configurations according to one embodiment. The method of FIG. 5 can be performed by processing logic that can include hardware (e.g., processing device, circuitry, dedicated logic, programmable logic, microcode, hardware of a device, integrated circuit, etc.), software/firmware (e.g., instructions run or executed on a processing device), or a combination thereof. In some embodiments, the method of FIG. 5 is performed at least in part by the controller 115 of FIG. 1, or processing logic in the memory device 130 of FIG. 4. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

For example, the method of FIG. 5 can be implemented in a memory system 110 of FIG. 1 or a memory device 130 of FIG. 4 to implement connection configurations illustrated in FIG. 2 and/or FIG. 3.

At block 301, a memory device 130 (or a memory system 110) having a plurality of connectors identifies a configuration of using the connectors.

The configuration can be one of a plurality of predefined configurations, such as a temporary configuration for connecting to a connection system A for a system of a manufacturer facility 160, or a normal configuration for connecting to a connection system B in a product system 100.

At block 303, the memory device 130 having a communication interface 149A coupled with the connectors in a connector interface 150 configures the communication interface 149A to effectuate the configuration.

In response to a decision 305 to effectuate a first, normal configuration, the communication interface 149A is configured at block 307 to use a first subset of the connectors to receive data signals.

In response to a decision 305 to effectuate a second, temporary configuration, the communication interface 149A is configured at block 309 to use a second subset, larger than the first subset, of the connectors to receive data signals, as illustrated in FIGS. 2 and 3.

For example, the communication interface 149A can be configured to ignore signals in one or more of the connectors (e.g., the connector set A 152 illustrated in FIG. 2) that are in the first subset but not in the second subset, when the memory device 130 is connected using the first, normal configuration. For example, such one or more of the connectors (e.g., the connector set A 152 illustrated in FIG. 2) can be used in the temporary configuration as extra data connectors that are not used in the normal configuration.

For example, the communication interface 149A can be configured to process signals in one or more of the connectors (e.g., the connector set D 158 illustrated in FIG. 3) that are in the first subset but not in the second subset as non-data signals, when the memory device 130 is connected using the first, normal configuration. For example, such one or more of the connectors (e.g., the connector set D 158 illustrated in FIG. 3) can be used in the temporary configuration as extra data connectors that are used in the normal configuration as other types of connectors (e.g., as address connectors).

For example, a semiconductor memory device 130 can have a connector interface 150 having a plurality of connectors. The semiconductor memory device 130 further has a plurality of memory cells (e.g., 131, 133) and a communication interface 149A coupled between the plurality of connectors and the plurality of memory cells. The communication interface 149A is operative to provide data retrieved from the plurality of memory cells via the plurality of connectors in response to read commands and to receive data via the plurality of connectors for storing into the memory cells in response to write commands.

The communication interface 149A is configurable to allow a first configuration of using the connectors (e.g., a normal pin configuration) and a second configuration of using the connectors (e.g., a temporary pin configuration). When the first configuration of connecting the plurality of connectors to a first host (e.g., the controller 115 or the host system 120) is used, the memory device 130 allows data to be written into the plurality of memory cells at a first speed. When the second configuration of connecting the plurality of connectors to a second host (e.g., the system of a manufacturer facility 160) is used, the memory device allows data to be written into the plurality of memory cells at a second speed that is faster than the first speed. The greater speed at the second configuration can be achieved through allocating more counts of connectors for data input/output, e.g., by using extra pins/connectors that are not used in the normal configuration or by re-allocating other types of pins used in the normal configuration as data pins. Thus, the second configuration provides a greater data communication bandwidth than the first configuration, even when the first and second configurations are operated at a same frequency.

For example, some of the pins/connectors used in the normal configuration for command transmission, address transmission, or control signal transmission, or any combination thereof can be re-allocated for data transmission to increase the data communication bandwidth in the temporary configuration.

When the first, normal configuration is used, the first host and the memory device can communicate with each other via the first configuration of the connectors in accordance with a first communication protocol. When the second, temporary configuration is used, the second host and the memory device can communicate with each other via the second configuration of the connectors in accordance with a second communication protocol that is different from the first communication protocol. For example, the first communication protocol can be in accordance with a published industry standard; and the first communication protocol can be a specialized protocol for the system of the manufacturer facility 160.

The memory device 130 can have a configuration manager 113 configured to determine whether the plurality of connectors of the memory device 130 is connected in the first configuration or in the second configuration.

For example, the memory device 130 can have a non-volatile memory cell configured to store an indication of whether the connectors are currently being used in the first configuration (e.g., normal) or the second configuration (e.g., temporary). The configuration manager 113 is configured to determine, based on a value stored in the memory cell, whether the memory device is connected, via the plurality of connectors, in the first configuration (e.g., in a product system 100) or in the second configuration (e.g., in a system of a manufacturer facility 160).

For example, the configuration manager 113 can be configured to determine whether the memory device is connected, via the plurality of connectors, in the first configuration or in the second configuration based on a connection status of a connector in the plurality of connectors, or a characteristic of signals in the connector, or any combination therein.

The memory device 130 can be enclosed in a single integrated circuit package; and the configuration manager 113 can be fabricated on a same integrated circuit die of the plurality of memory cells (e.g., 131 and 133) that are non-volatile.

In another example, a memory system 110 includes a plurality of connectors (e.g., 192, 193, ...), a processing device 117; and at least one memory device (e.g., 143, 130, 140) having a plurality of memory cells (e.g., 131 and 133). The memory system has a communication interface 149B coupled between the plurality of connectors (e.g., 192, 193, ...) and the memory device (e.g., 143). The communication interface 149B is operative to provide data retrieved from the memory device (e.g., 143) via the plurality of connectors in response to read commands and to receive data via the plurality of connectors for storing into the memory device in response to write commands. The communication interface 149 is configurable to allow a first, normal configuration of the connectors and a second, temporary configuration of the connectors. When the memory system 110 is connected to a first host 120 using the first configuration of the connectors, a first subset of connectors (e.g., 192) is connected to a first data bus. When the memory system 110 is connected to a second host 160 using the second configuration of the connectors, a second subset of connectors (e.g., 192 and 193) is connected to a second data bus. The second subset includes at least one connector that is not connected to the first data bus in the first configuration. For example, the at least one connector can be an extra pin(s) that is/are not used in the first, normal configuration in a product system 100. For example, the at least one connector can be connected in the first, normal configuration to communicate signals other than data to be written into the at least one memory device and data retrieved from the at least one memory device, and reconfigured in the second, temporary configuration to communicate data to be written into the at least one memory device.

Optionally, at least a portion of the configuration manager 113 can be implemented via instructions executed by the memory system 110 or the memory device 130. For example, the instructions can be executed by the processing device 117 and/or the controller 115 of the memory system 110, or by the controller 132 of the memory device 130.

Figure 6:
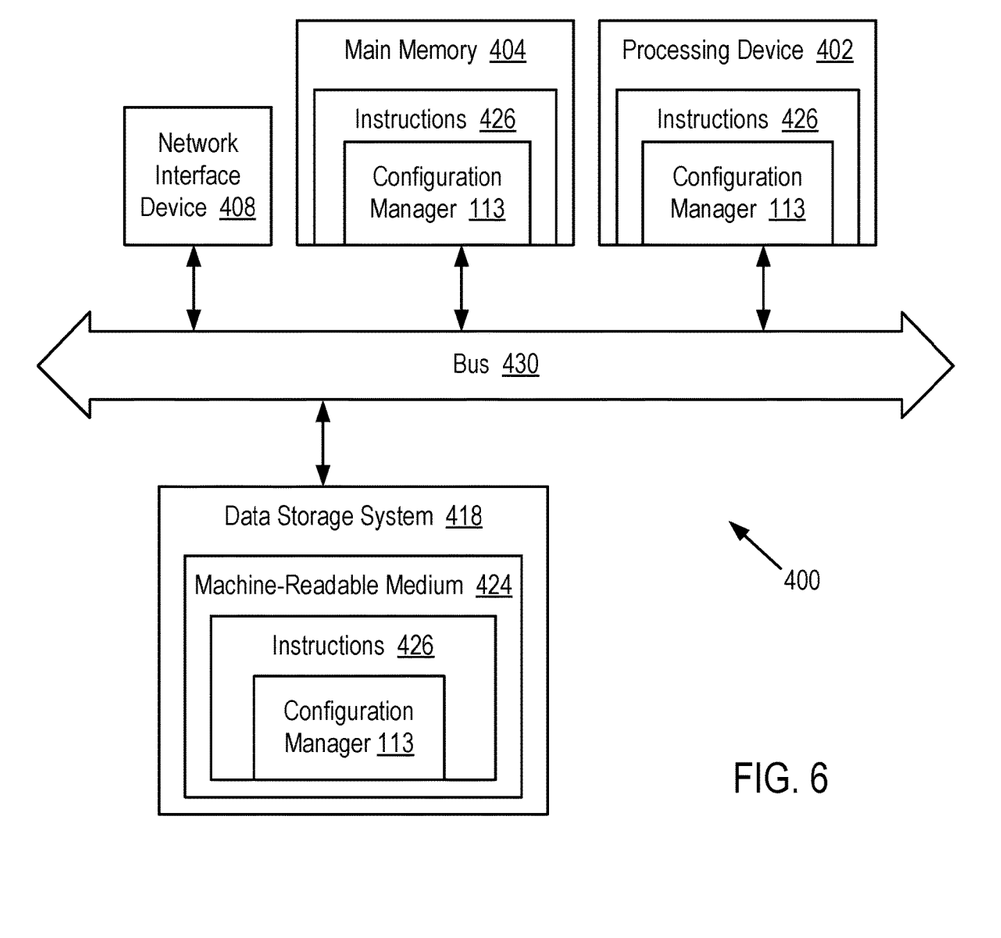
FIG. 6 is a block diagram of an example computer system in which embodiments of the present disclosure can operate.

FIG. 6 illustrates an example machine of a computer system 400 within which a set of instructions, for causing the machine to perform any one or more of the methodologies discussed herein, can be executed. In some embodiments, the computer system 400 can correspond to a host system (e.g., the host system 120, and/or the manufacturer on-facility system 160 of FIG. 1) that includes, is coupled to, or utilizes a memory system (e.g., the memory system 110 of FIG. 1) or can be used to perform the operations of the configuration manager 113 (e.g., to execute instructions to perform operations corresponding to the configuration manager 113 described with reference to FIGS. 1-5). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 400 includes a processing device 402, a main memory 404 (e.g., read-only memory (ROM), flash memory, dynamic random access memory (DRAM) such as synchronous DRAM (SDRAM) or Rambus DRAM (RDRAM), static random access memory (SRAM), etc.), and a data storage system 418, which communicate with each other via a bus 430 (which can include multiple buses).

Processing device 402 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 402 can also be one or more special-purpose processing devices such as an application specific integrated circuit (ASIC), a field programmable gate array (FPGA), a digital signal processor (DSP), network processor, or the like. The processing device 402 is configured to execute instructions 426 for performing the operations and steps discussed herein. The computer system 400 can further include a network interface device 408 to communicate over the network.

The data storage system 418 can include a machine-readable storage medium 424 (also known as a computer-readable medium) on which is stored one or more sets of instructions 426 or software embodying any one or more of the methodologies or functions described herein. The instructions 426 can also reside, completely or at least partially, within the main memory 404 and/or within the processing device 402 during execution thereof by the computer system 400, the main memory 404 and the processing device 402 also constituting machine-readable storage media. The machine-readable storage medium 424, data storage system 418, and/or main memory 404 can correspond to the memory system 110 of FIG. 1.

In one embodiment, the instructions 426 include instructions to implement functionality corresponding to a configuration manager 113 (e.g., configuration manager 113 described with reference to FIGS. 1-5). While the machine-readable storage medium 424 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some embodiments, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In this description, various functions and operations are described as being performed by or caused by computer instructions to simplify description. However, those skilled in the art will recognize what is meant by such expressions is that the functions result from execution of the computer instructions by one or more controllers or processors, such as a microprocessor. Alternatively, or in combination, the functions and operations can be implemented using special purpose circuitry, with or without software instructions, such as using Application-Specific Integrated Circuit (ASIC) or Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. An apparatus, comprising:
   a first plurality of connectors;
   a controller configured to communicate with a host to transfer data between the apparatus and the host via the first plurality of connectors; and an integrated circuit memory device, comprises:
- a second plurality of connectors connected to the controller to transfer the data to the host via the controller;
- a plurality of memory cells configured to store the data;
- a configuration manager; and
- a communication interface coupled between the second plurality of connectors and the plurality of memory cells, the communication interface operative to provide the data, retrieved from the plurality of memory cells, via the second plurality of connectors in response to read commands and to receive the data via the second plurality of connectors for writing to the memory cells in response to write commands;
- wherein the communication interface is configurable in a first configuration of communication through the second plurality of connectors to write data received from the controller to the integrated circuit memory device at a first speed;
- wherein the communication interface is configurable in a second configuration of communication through the second plurality of connectors to write data received from the controller to the integrated circuit memory device at a second speed, the second speed faster than the first speed; and
- wherein the second plurality of connectors includes a first subset of connectors and a second subset of connectors; the first subset is not connected to the controller in the first configuration and is connected to the controller in the second configuration; and the second subset is connected to the controller in the first configuration and to the controller in the second configuration.

2. A method, comprising:
- identifying, by a memory device having a second plurality of connectors, a configuration of the connectors, wherein the memory device is connected via the second plurality of connectors to a controller of a storage apparatus that is configured to be connected to a host via a first plurality of connectors; and
- configuring, by the memory device having a communication interface coupled with the second plurality of connectors, the communication interface to effectuate the configuration, including:
  - configuring in a first configuration of the second plurality of connectors to write data received from the controller at a first speed; and
  - configuring in a second configuration of the second plurality of connectors to write data received from the controller at a second speed, the second speed faster than the first speed;
- wherein the second plurality of connectors includes a first subset of connectors and a second subset of connectors; the first subset is not connected to the controller in the first configuration and is connected to the controller in the second configuration; and the second subset is connected to the controller in the first configuration and to the controller in the second configuration.

3. A memory system, comprising:
- a first plurality of connectors configured to be connected to a host system;
- a processing device configured to control operations of the memory system; and
- at least one integrated circuit memory device, the integrated circuit memory device comprising:
  - a second plurality of connectors configured to connect the integrated circuit memory device to the processing device;
  - a plurality of memory cells; and
  - a communication interface coupled between the second plurality of connectors and the plurality of memory cells, the communication interface operative to provide data, retrieved from the memory cells, via the second plurality of connectors in response to read commands from the processing device and to receive data via the second plurality of connectors for writing to the memory cells in response to write commands;
- wherein the communication interface is configurable in a first configuration with the second plurality of connectors to write data received from the processing device at a first speed;
- wherein the communication interface is configurable in a second configuration with the second plurality of connectors to write data received from the processing device at a second speed, the second speed faster than the first speed;
- wherein the second plurality of connectors includes a first subset of connectors and a second subset of connectors; the first subset is not connected to the processing device in the first configuration and is connected to the processing device in the second configuration; and the second subset is connected to the processing device in the first configuration and to the processing device in the second configuration.

4. The apparatus of claim 1, wherein the first configuration has a first count of connectors being connected to a data bus; and the second configuration has a second count of connectors being connected to a data bus; and the second count is larger than the first count.

5. The apparatus of claim 1, wherein the integrated circuit memory device is configured to operate at a same frequency for the first configuration and the second configuration.

6. The apparatus of claim 1, wherein at least one of the second plurality of connectors is used for a first type of communication in the first configuration, and used for a second type, different from the first type, of communication in the second configuration.

7. The apparatus of claim 6, wherein the first type of communication and the second type of communication are different ones of data transmission, command transmission, address transmission, or control signal transmission, or any combination thereof.

8. The apparatus of claim 1, wherein communications between the controller and the integrated circuit memory device via the first configuration of the connectors are in accordance with a first communication protocol; and communications between the controller and the integrated circuit memory device via the second configuration of the connectors are in accordance with a second communication protocol that is different from the first communication protocol.

9. The apparatus of claim 8, wherein the first communication protocol is in accordance with a published standard.

10. The apparatus of claim 1, further comprising:
- a memory cell storing an indication of whether the second plurality of connectors are currently being used in the first configuration or the second configuration.

11. The apparatus of claim 10, wherein the configuration manager is configured to determine, based on a value stored in the memory cell, whether the integrated circuit memory device is connected, via the second plurality of connectors, in the first configuration or in the second configuration.

12. The apparatus of claim 1, wherein the configuration manager is configured to determine whether the integrated circuit memory device is connected, via the second plurality of connectors, in the first configuration or in the second configuration based on a connection status of a connector, or a characteristic of signals in the connector, or any combination therein.

13. The apparatus of claim 1, wherein the integrated circuit memory device is enclosed in a single integrated circuit package.

14. The apparatus of claim 13, wherein the configuration manager is fabricated on an integrated circuit die of the plurality of memory cells; and the plurality of memory cells are non-volatile.

15. The method of claim 2, further comprising:
configuring the communication interface to ignore signals in one or more of the connectors that are used in the first configuration but not in the second configuration, when the memory device is connected using the first configuration.

16. The method of claim 2, further comprising:
configuring the communication interface to process signals in one or more of the connectors that are in the first configuration but not in the second configuration as non-data signals, when the memory device is connected using the first configuration.

17. The memory system of claim 3, wherein at least one connector in the second plurality of connectors is not used in the first configuration.

18. The memory system of claim 3, wherein at least one connector in the second plurality of connectors is connected in the first configuration to communicate signals other than data to be written into the memory cells and data to be retrieved from the memory cells.

19. The apparatus of claim 1, wherein the integrated circuit memory device is a flash memory device.

* * * * *